Nov. 28, 1961  R. R. KOZINSKI  3,010,167
METHOD OF CASTING AIR BRAKE HOSE COUPLINGS
Filed July 14, 1958  5 Sheets-Sheet 2

INVENTOR.
RICHARD R. KOZINSKI
BY *Ely, Frye & Hamilton*
ATTORNEYS

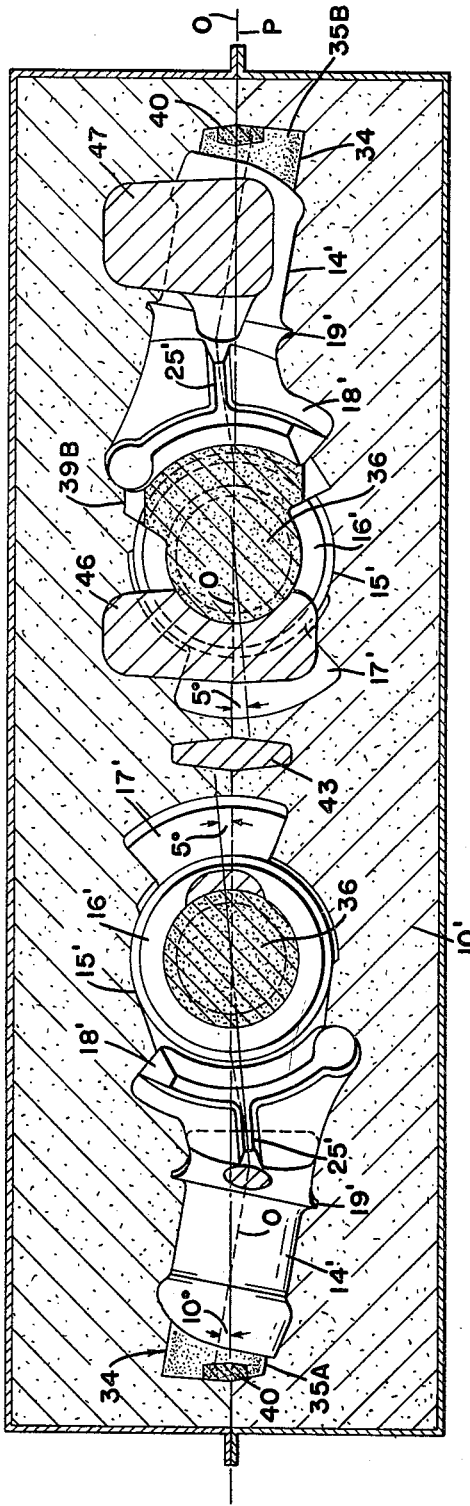
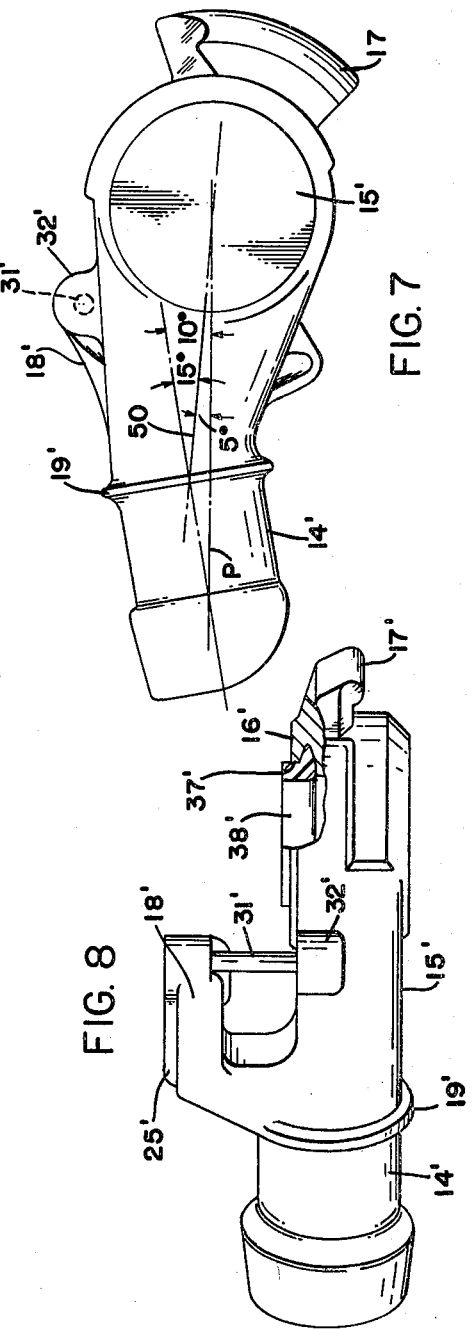

Nov. 28, 1961  R. R. KOZINSKI  3,010,167
METHOD OF CASTING AIR BRAKE HOSE COUPLINGS
Filed July 14, 1958  5 Sheets-Sheet 5
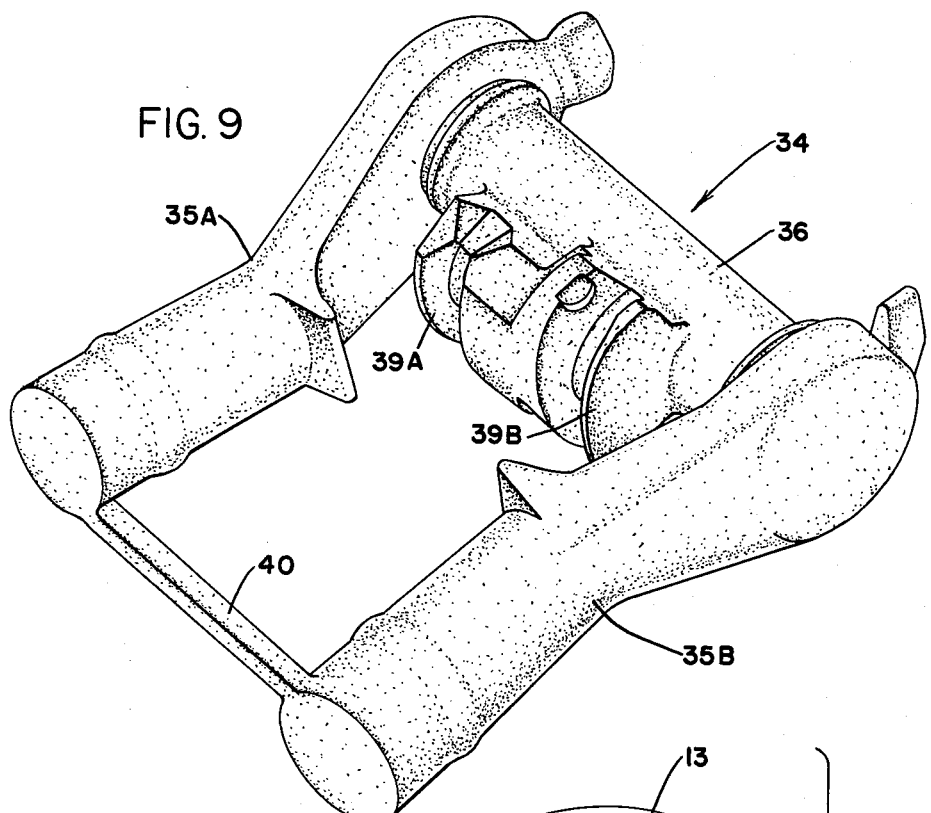
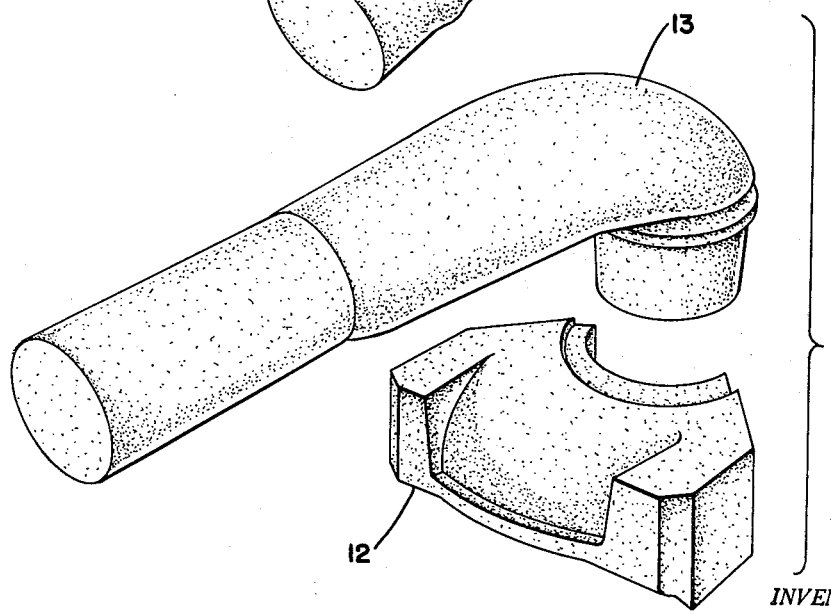
INVENTOR.
RICHARD R. KOZINSKI
BY Ely, Frye & Hamilton
ATTORNEYS United States Patent Office 3,010,167
Patented Nov. 28, 1961

3,010,167
METHOD OF CASTING AIR BRAKE HOSE COUPLINGS
Richard R. Kozinski, 3316 27th St. NW., Canton 8, Ohio
Filed July 14, 1958, Ser. No. 748,290
5 Claims. (Cl. 22—200)

The invention relates to the manufacture of air brake hose couplings which will meet the requirements of the American Railway Association, or the trucking industry, and which are compatible or interchangeable with couplings now being used. More particularly, the invention relates to a new and improved method of casting such couplings more economically in respect to time, labor and materials.

According to the requirements of A.R.A. (American Railway Association) and the trucking industry, air brake hose couplings are made in two identical parts which couple or uncouple by rotating one part relative to the other about 90° on the axis of the coupling joint. In the railway couplings, each part has a rearwardly extending tubular neck which telescopes into the end of a section of hose and an annular shoulder on the neck abuts the end of the hose. The neck communicates at an angle of 15° with a tubular passageway which turns through 90° in a direction at right angles to the plane of the 15° angle and terminates in a flat coupling face having a forwardly extending ear-like coupling flange. An annular sealing gasket is seated in the opening in the coupling face. An angular flange extends laterally and then forwardly from the inner part of the neck in an ear-like portion and terminates opposite the rear inner portion of the coupling face. The angular flange of one part cooperates with the ear-like flange extending forwardly of the face on the other part to clamp the two faces in vertically disposed juxtaposition, with their gaskets in abutment when the parts are coupled in normal position, in which position they bear a resemblance to clasped hands.

The requirements of ARA with respect to these couplings are very rigid and include close tolerances to meet ARA coupling gages with respect to the angles and dimensions of various portions of the coupling, and the standard approved design has numerous undercut portions providing back draft. Consequently, in order to cast these coupling parts in a practical and economical manner, and with a minimum amount of coring, the accepted practice for many years, and in fact the only apparent practicable procedure, has been to cast the parts in a position in the mold in which the flat coupling face is face down in a horizontal position.

This accepted casting practice requires two separate cores for each casting and enables casting only four parts in a standard mold approximately 10" x 19" in area. The cost of making castings in the foundry is based on the area of the mold, considering its depth to be uniform so that four castings are obtained in such case for 190 square inches of mold surface.

The process of the present invention includes casting the coupling parts in pairs with their flat coupling faces rotated 90° from the prior face-down position to vertical positions opposing each other, preferably slightly tilting the parts end for end to minimize certain back draft portions and provide offset parting lines largely on surfaces to be machined, and utilizing one core for one or more pairs of coupling parts.

An object of the present invention is to provide a novel casting process for increasing the number of coupling parts which can be cast in a standard mold of given area.

Another object is to provide a novel casting process for producing coupling parts which greatly reduces the amount of grinding and machining necessary.

A further object is to provide a novel casting process for producing coupling parts which enables setting a single core for one or more pairs of parts, in such manner as to prevent the core from twisting, turning or floating during the casting operation.

A still further object is to provide an improved method of casting coupling parts which requires a minimum of time, labor and materials, and which produces a lightweight streamlined coupling part which meets all of the ARA gage requirements or trucking industry requirements for air brake hose coupling parts.

These objects, and others which will appear from the following description, are accomplished by the improvements comprising the present invention, a preferred embodiment of which is disclosed by way of example in the accompanying drawings, and described in detail herein.

Referring to the drawings:

FIG. 6 is an enlarged vertical sectional view taken substantially on line 6—6 of FIG. 1, looking at the front sides of two coupling parts positioned in the mold and showing the offset parting lines therefor.

FIG. 7 is an enlarged rear side elevation of one of the finished coupling parts made according to the improved process.

FIG. 8 is a plan elevation of the finished coupling part of FIG. 7, partly broken away to show the annular sealing gasket in the opening in the coupling face.

FIG. 9 is a perspective view of the one-piece core used in making a pair of coupling parts according to the improved process.

FIG. 10 is a perspective view of the two-piece core used in making one coupling part according to the prior conventional process.

Figure 2:
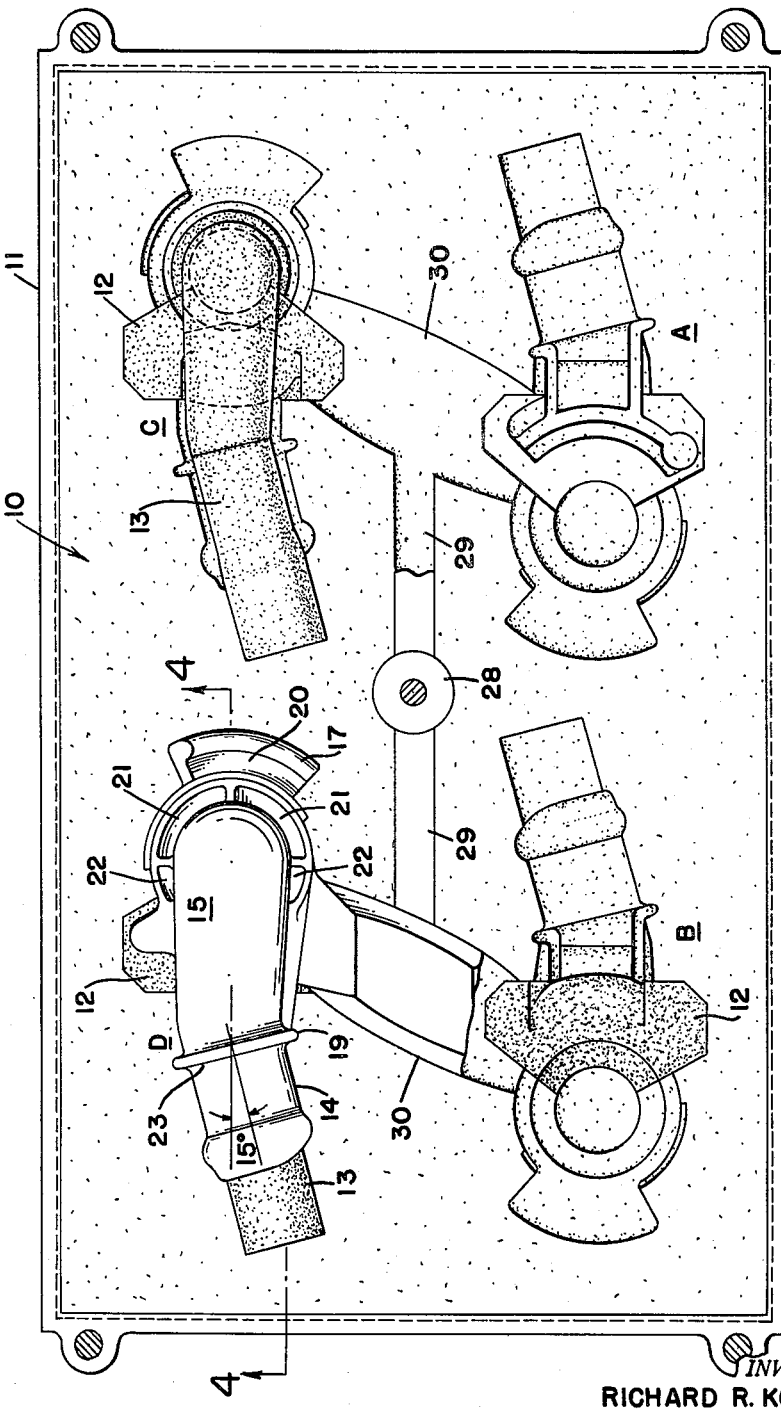
FIG. 2 is a similar view of a mold used for making two pairs of coupling parts using eight separate cores, according to prior conventional practice.
Figure 4:
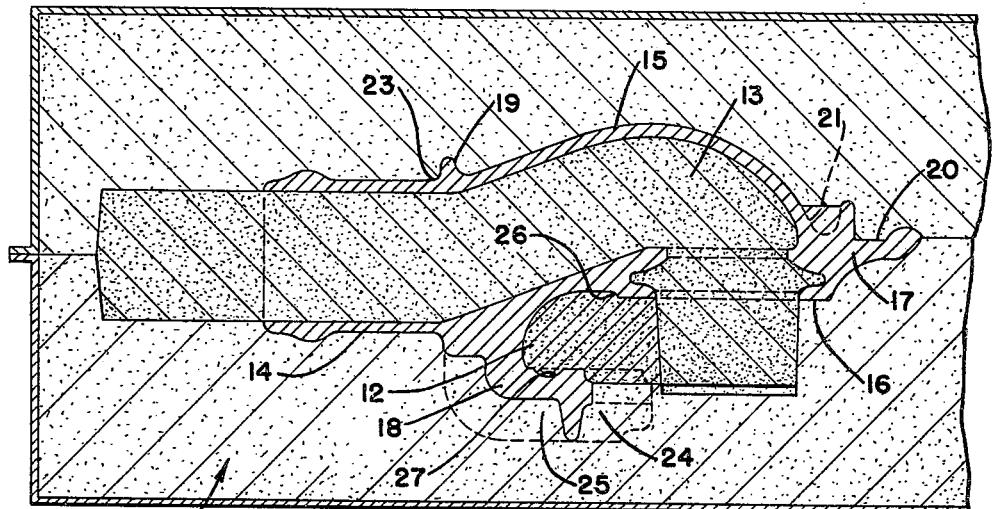
FIG. 4 is an enlarged fragmentary vertical section of one of the coupling parts and the cores therein as cast according to prior conventional practice, taken on line 4—4 of FIG. 2.
Figure 5:
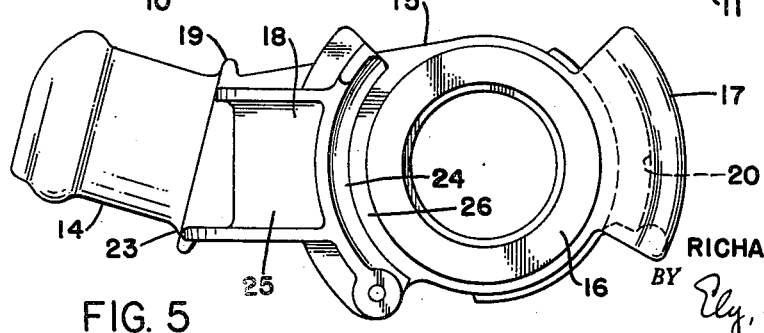
FIG. 5 is a bottom plan view of the coupling part of FIG. 4.

Referring first to FIGS. 2, 4, 5 and 10 relating to the prior conventional process of casting air brake hose coupling parts, FIG. 2 shows the lower half of a typical four-cavity sand mold 10 of rectangular configuration 10 inches long and 19 inches wide and contained in a foundry flask indicated at 11. Cavity A is shown after the impression has been formed around the pattern and before setting the cores; cavity B has the lower piece 12 of the two-piece core shown in FIG. 9 set in place; cavity C has both pieces 12 and 13 set in place; and cavity D has the casting formed around the two-piece core. Reference to FIG. 4 indicates that the location of the parting line in the conventional process requires subsequent machining or grinding of a number of surfaces which would not otherwise require machining.

The coupling parts each have a tubular neck 14, connected at an angle of 15° with a tubular body 15, the bore of which terminates in the coupling face 16 disposed at right angles to the plane of the 15° angle. An arcuate ear-like flange 17 extends forwardly of the coupling face, and an angular flange 18 extends laterally and forwardly from the neck for cooperating with the flange 17 of a mating coupling part of identical construction. An annular shoulder 19 is provided on the neck 14 for abutting the end of a hose section telescoped over the neck.

Figure 1:
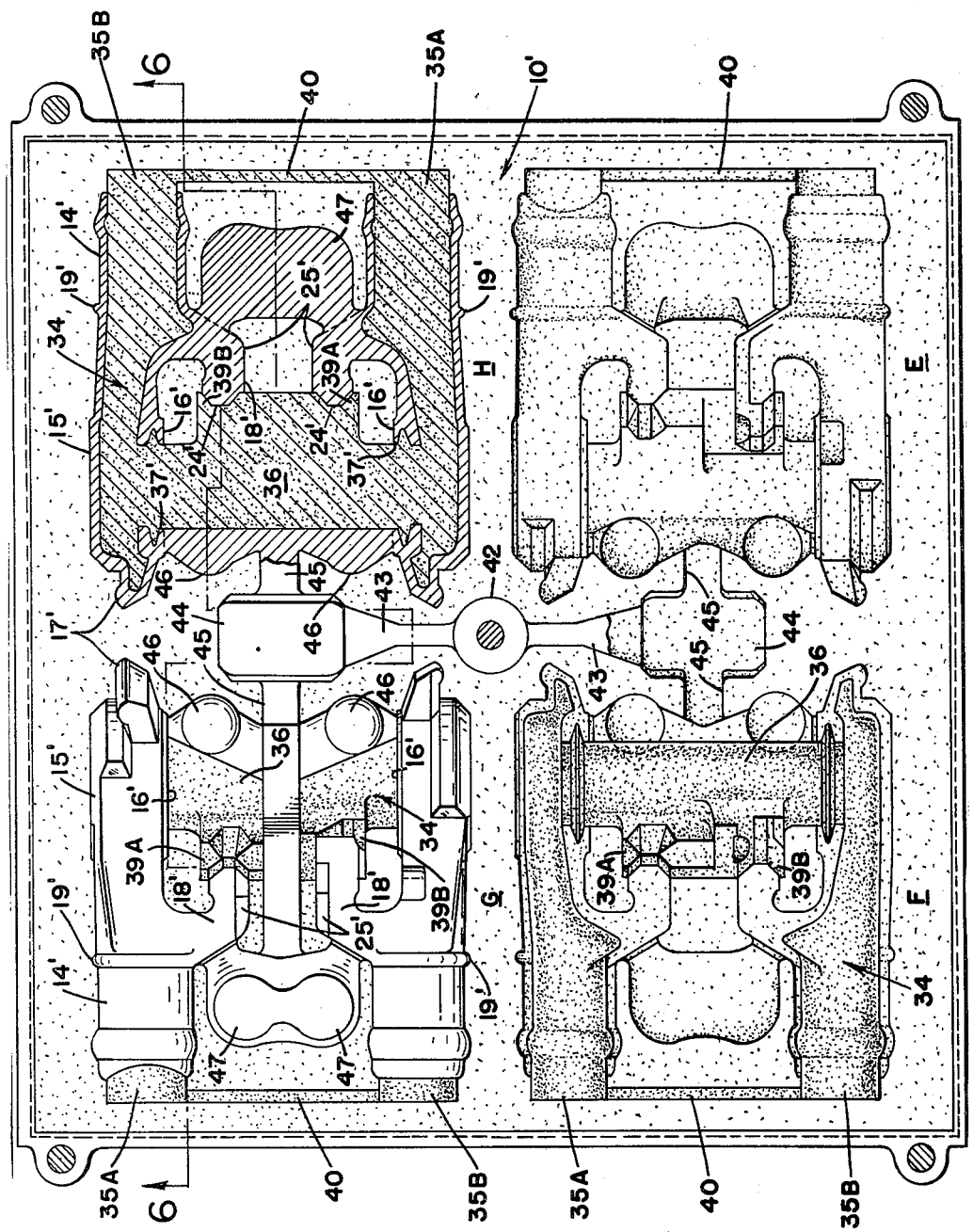
FIG. 1 is a plan view partly in section of a mold used for making four pairs of railway coupling parts using four cores, the several mold cavities being shown at various stages of the improved process.

The undercut portions 20, 21, 22, 23, 24 and 25 provide back draft which appears to preclude casting the parts in the positions of FIG. 1 in which they have been turned through 90° to bring the coupling faces opposite each other, without the use of an excessive number of cores requiring substantial additional labor, time and material. Moreover, because of the interior arcuate undercut portions 26 and 27, turning of the castings would still require making separate cores and then adhering them together before placing them in the mold, although the core pieces 12 and the core pieces 13 could be made in pairs to serve two castings.

In FIG. 2, the location of the pouring sprue is indicated at 28, and two runners 29 extend therefrom in opposite directions to supply molten metal to the risers 30 which feed molten metal to the mold cavities A and C and B and D, respectively. Obviously, to double the number of mold cavities would require substantially doubling the width of the mold which would greatly increase the cost according to the limits of standard foundry practice.

Referring to FIGS. 1 and 6–8, the coupling part produced by the present improved process has been somewhat streamlined, and certain incidental undercut portions filled in, but all the critical and essential dimensions and angles have been maintained, so that the couplings meet the requirements of ARA coupling gages. The neck 14' is connected to the body 15' at an angle of 15°, and the body is flattened on its back side, but its bore turns 90° and terminates in the flat coupling face 16' as in the conventional construction.

The arcuate undercut portions 21 and 22 around the front of the body have been filled in with metal which not only eliminates back draft at those points but reinforces the front wall of the body. The arcuate undercut portions 20 on the ear-like flange 17 have been filled in, and the ribs defining the undercut portion 25 have been replaced by a single rib 25' located on the parting line, thus eliminating back draft at those points. A fillet of increased radius has been provided on either side of the rib 19' to substantially eliminate the back draft at those points. Otherwise, the construction of the coupling part, including the arcuate forward ear-like flange 17' and the angular flange 18', is substantially identical with that of the coupling part shown in FIGS. 2, 4 and 5.

The pin 31' is a stop pin inserted after the casting operation between a boss 32' on the body and one end of the arcuate ear-like portion of angular flange 18'. The pin acts as a stop against the end of flange 17' on a mating coupling part when the two parts are rotated within their coupling faces in register and their flanges 17' and 18' in cooperative engagement. A similar stop pin is inserted after casting in the coupling part shown in FIGS. 2, 4 and 5.

In the present improved process, with the coupling parts cast in the mold in the positions shown in FIG. 1, and the vertically disposed coupling faces of each pair opposite each other, a single one-piece core indicated generally at 34 and best shown in FIG. 9 can be used for each pair of couplings. The core 34 is preferably made by the well-known shell molding process, and has opposed parallel elongated portions 35A and 35B for forming the tubular passageways or conduits extending through the coupling parts. A transverse portion 36 connects the front ends of portions 35A and 35B and forms the openings 37' in the coupling faces 16' in which annular resilient gaskets 38' are seated, as seen in FIG. 8.

The arcuate projections 39A and 39B extending rearwardly from portion 36 form the front arcuate surfaces 24' of the angular flanges 18' on the castings, and are connected together by transverse core material. A stabilizing strut or tie bar 40 connects the rear ends of the parallel portions 35A and 35B. Thus, the elongated portions 35A and 35B are connected together at both ends, forming a rigid and stable one-piece core which when set in the mold cavity will not twist, turn or float during the casting operation. The strut 40 and the ends of portions 35A and 35B to which it is connected, as well as the intermediate connecting parts of transverse portion 36, form parts of the so-called "core print" in the mold, as seen in FIG. 1.

In FIG. 1, one impression or double cavity made in the mold 10' by the pattern is indicated at cavity E for one pair of castings, a similar impression with the core 34 in place is indicated at F, another similar impression after the molten metal has been introduced and filled around the core is indicated at G, and a plan section through the metal and core in still another impression is indicated at H. Thus, four pairs of coupling parts can be cast in a mold approximately 15 inches wide by 16 inches long, making an area of 240 square inches for 8 parts, as compared with an area of 190 square inches for 4 parts in the prior conventional method.

The location of the pouring sprue is indicated at 42, and two runners 43 extend in opposite directions therefrom to supply molten metal to reservoirs or feeders 44 which feed the molten metal laterally in opposite directions to the double mold cavities through runners 45. As best shown in impression G, the runners 45 may have branches connecting with risers 46 supplying metal to the front ends of the castings, and the runners 45 are connected at their outer ends to risers 47 supplying metal to the rear ends of angular flanges 18'.

Obviously, the double cavity impressions can be reversed so that their neck portions oppose each other, in which case the struts 40 of impressions E and F, and of impressions G and H, would be joined to make one common strut and one integral core would be used to make two pairs of castings.

Referring to FIG. 6, the impressions are made in the mold so that the parts are tilted end for end in the mold with respect to the centerline 50 of the body, so that the angle of the neck 14' is decreased with respect to the horizontal plate line of the mold. Thus, as shown in FIG. 7, if the forward end of the body is tilted downward 5°, the angle between the horizontal plate line P and centerline 50 becomes 5°, while the angle between the axis of neck 14' and the horizontal parting line becomes 10°. As a result the flange 19' is disposed at 10° to the vertical, which, together with the shallower fillets along the flange, substantially eliminates back draft. The opposed coupling parts of each pair are tilted in opposite directions in order to tilt the neck toward the horizontal plate line in each case.

As shown in FIG. 6, the offset parting line O passes horizontally across the coupling faces 16' at angles of 5° to the centerlines 50, and coincides with the axes of the necks 14' at 10° to the plate line. The 10° parting lines are connected to the horizontal parting lines by lines angled approximately 10° in the opposite direction. The parting line passes across a number of surfaces which are already required to be machined, such as the surfaces indicated at f in FIG. 3, and across other surfaces already required to be coin pressed or snag ground, such as the surfaces indicated at c and g.

Figure 3:
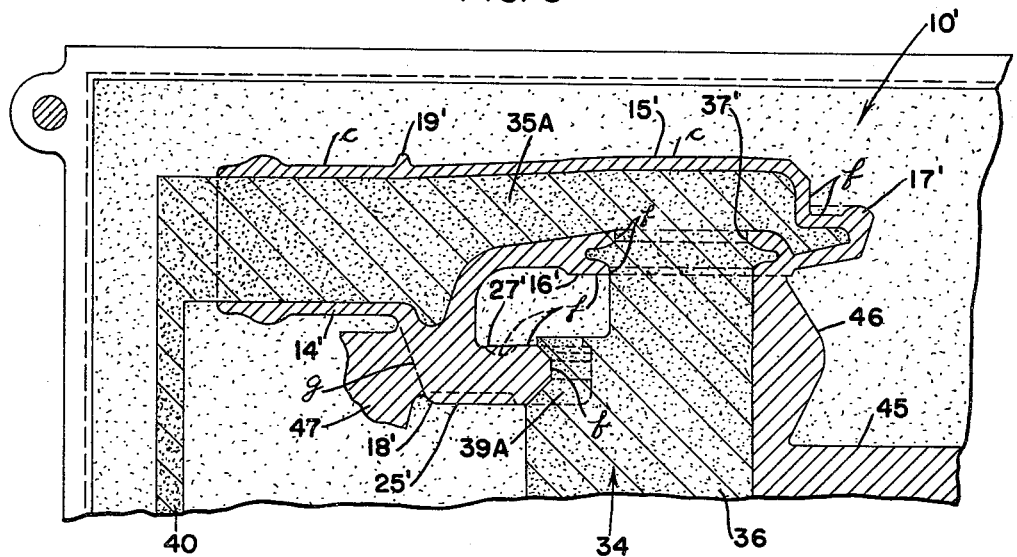
FIG. 3 is an enlarged fragmentary plan sectional view similar to FIG. 1, showing one coupling part as cast and the core therein.

As shown in FIG. 3, the undercut groove 27' is cast flat and later machined so that the recess under the angular flange 18' need not be cored as in the conventional process, but can be formed in green sand. The substantially flat back surface of the body 15' with its arcuate beveled edges facilitates chucking and machining operations.

While the improved process has been described as applied to the casting of air brake hose coupling parts for railway cars, it is also applicable to the casting of air brake hose coupling parts of slightly different design for truck and trailer combinations.

The improved process greatly increases the number of coupling parts produced in proportion to mold area, greatly reduces the number of cores required, facilitates accurate positioning of the cores in the mold, reduces the amount of machining and grinding and facilitates the machining operation, and produces a lighter and stronger coupling part with a minimum of time, labor and material.

What is claimed is:

1. The method of casting at least one pair at a time of air brake hose coupling parts, said coupling parts having back draft conduit openings at right angles to each other and an angular flange with a front arcuate surface and an arcuate undercut surface, said method comprising the steps of forming parallel cavities in each of the mating halves of the mold so as to have two like opening-forming faces opposing each other in each half and an arcuate undercut surface forming face in each said cavity, integrally coring coextensively with said cavities in one-half of the mold to form said back draft conduit openings and said front arcuate surface, closing the mold, and introducing molten metal into said cavities.

2. The method of casting at least one pair at a time of air brake hose coupling parts, said coupling parts having back draft conduit openings at right angles to each other and an angular flange with a front arcuate surface and an arcuate undercut surface, said method comprising the steps of forming parallel cavities in each of the mating halves of the mold so as to have offset parting lines and two like opening-forming faces opposing each other in each half and an arcuate undercut surface forming face in each said cavity, coring in a closed path through both cavities to form said back draft conduit openings and said front arcuate surface, closing the mold, and introducing molten metal into said cavities.

3. The method of casting at least one pair at a time of air brake hose coupling parts, said coupling parts having back draft conduit openings at right angles to each other and an angular flange with a front arcuate surface and an arcuate undercut surface, said method comprising the steps of forming and simultaneously tilting end for end relative to a horizontal plane line parallel cavities in each of the mating halves of the mold so as to have offset parting lines and two like opening-forming faces opposing each other in each half and an arcuate undercut surface forming face in each said cavity, coring in a closed path through both cavities to form said back draft conduit openings and said front arcuate surface, closing the mold, and introducing molten metal into said cavities.

4. The method of casting at least one pair at a time of air brake hose coupling parts, said coupling parts having back draft conduit openings at right angles to each other and an angular flange with a front arcuate surface and an arcuate undercut surface, said method comprising the steps of forming and simultaneously tilting end for end relative to a horizontal plane line parallel cavities in each of the mating halves of the mold so as to have offset parting lines and two like opening-forming faces opposing each other in each half and an arcuate undercut surface forming face in each said cavity, integrally coring coextensively with said cavities in one-half of the mold to form said back draft conduit openings and said front arcuate surface, closing the mold and introducing molten metal into said cavities.

5. The method of casting at least one pair at a time of air hose coupling parts, said coupling parts having connecting back draft conduits at 15° to each other, back draft conduit openings at right angles to each other, and an angular flange with a front arcuate surface and an arcuate undercut surface, said method comprising the steps of forming and simultaneously tilting end-for-end about 5° in opposite directions relative to a horizontal plane line parallel cavities in each of the mating halves of the mold so as to have offset parting lines and two like opening-forming faces opposing each other in each half and an arcuate undercut surface forming face in each said cavity, coring in a closed path through both cavities to form said back draft conduit openings and said front arcuate surface, closing the mold, and introducing molten metal into said cavities.

References Cited in the file of this patent

UNITED STATES PATENTS

| | | |
|---|---|---|
| 1,189,391 | Schultze | July 4, 1916 |
| 1,353,472 | Haase | Sept. 21, 1920 |
| 1,525,662 | Schwartz et al. | Feb. 10, 1925 |
| 1,535,802 | Bendixen | Apr. 28, 1925 |
| 1,667,720 | Copeman | May 1, 1928 |
| 2,368,718 | Miller | Feb. 6, 1945 |
| 2,420,756 | Miller | May 20, 1947 |

FOREIGN PATENTS

| | | |
|---|---|---|
| 13,985 | Great Britain | of 1905 |